United States Patent [19]

Thiele et al.

[11] Patent Number: 4,593,461
[45] Date of Patent: Jun. 10, 1986

[54] POWER CELL ASSEMBLY

[75] Inventors: Karl O. Thiele, Bloomfield Hills; Steven L. Toth, Pontiac, both of Mich.

[73] Assignee: Enetronics, Inc., Clawson, Mich.

[21] Appl. No.: 676,727

[22] Filed: Nov. 30, 1984

Related U.S. Application Data

[62] Division of Ser. No. 522,823, Aug. 12, 1983, abandoned.

[51] Int. Cl.$^4$ .................. H01M 6/00; H01M 2/10
[52] U.S. Cl. .................. 29/623.1; 429/98; 429/99; 429/100
[58] Field of Search .................. 429/98–100, 429/158, 159; 29/623.1

[56] References Cited

U.S. PATENT DOCUMENTS

| | | | |
|---|---|---|---|
| 1,606,286 | 9/1926 | Zook | 429/159 |
| 1,825,088 | 9/1931 | Powell et al. | 429/98 X |
| 1,887,811 | 11/1932 | Ikin | 429/99 |
| 3,887,394 | 6/1975 | Kaye | 429/99 |
| 3,923,549 | 12/1975 | Mabuchi et al. | 429/158 X |

Primary Examiner—Brian E. Hearn
Assistant Examiner—Stephen J. Kalafut
Attorney, Agent, or Firm—Reising, Ethington, Barnard, Perry & Milton

[57] ABSTRACT

A power pack assembly (10) for operating equipment such as video equipment (12) including a plurality of power cells (14). The power cells (14) are connected in series to operate video equipment (12). A housing supports the power cells (14) and includes nonconductive partitioning walls (36) within the housing (35) for insulating and separating the adjacent ones of the power cells (14) from each other. A method is provided for making the power cell assembly (10) including the steps of disposing the plurality of power cells (14) between the partitioning walls (36) of the base member (42) and adjacent the floor portion (44) thereof, electrically connecting the power cells (14) in series within the base member (42) and enclosing the connected power cells (14) to provide external insulation between the connected power cells (14) and the external environment.

4 Claims, 8 Drawing Figures

POWER CELL ASSEMBLY

This division of application Ser. No. 522,823, filed on Aug. 12, 1983, now abandoned.

TECHNICAL FIELD

This invention relates to power cell assemblies for supplying electrical power for electronic and other equipment, e.g., video equipment, such as a video camera. More specifically, the invention provides a casing for a plurality of nickel cadmium power cells in a novel method of assembling the power cell assembly.

BACKGROUND ART

Prior art power packs for video equipment comprise a variety of lead acid batteries. The power provided by these power' packs are directly proportional to the size and weight of the power packs. Power packs having sufficient constant power output to operate a video camera for a reasonable length of time are burdensomely heavy. Even with the additional weight and size, these power packs do not satisfy the needs of most amateur and professional video enthusiasts.

A major problem for video equipment manufacturers is the packaging of the power packs. Prior art assemblies include a great amount of wasted space and further, there is a great concern among manufacturers that the packaging of the power packs should withstand the stresses encountered during use. Video power assemblies must be able to withstand a great deal of abuse during use.

This invention provides a power cell casing or packaging assembly which is compact yet provides structural support for a plurality of power cells contained therein. Unlike prior art shrink wrapped assemblies wherein a plastic casing is shrink wrapped around a plurality of power cells, this invention provides rigid internal support which shields the power cells from the external environment.

Power pack assemblies including rechargeable cells, such as nickel cadmium cells, have been found to provide greater power consistently over a significantly longer time span as compared to prior lead acid cell assemblies. The rechargeable cells are therefore quite economical. Optimally, naked nickel cadmium cells having an exposed charged pole and like charged cylindrical portion and an oppositely charged second pole are used. The use of such naked nickel cadmium cells present several problems. The cells are connected electrically in series. It would be quite awkward to have a single row or a stack of D size nickel cadmium cells, especially when power cell packs may require ten D size nickel cadmium cells. Hence, the cells must be arranged in a series of stacks having optimally two power cells in a stack and the charged cylindrical casings of adjacent stacks must be separated and insulated from each other. Secondly, the exposed oppositely charged poles of adjacent stacks must be electrically connected but the means connecting the cells, such as a conductive strip or wire, extending from a charged pole must be separated and insulated from the oppositely charged casing of the same cell, the casing usually extending over the charged pole and insulated from the pole internally. External insulation is required between the charged casing and the conductive connector. Thirdly, the charged naked cells must be insulated from the external environment while being encapsulated in a protected container. This invention provides a casing for insulating the naked nickel cadmium power cells internally and externally while further providing structural rigidity internally and protection from external abuse. Finally, this invention provides a novel process for manufacturing the power cell assembly wherein the power cells are lined and connected in series within the casing itself. In other words, the casing is an assembly tool in which the power cells are electrically connected.

STATEMENT OF THE INVENTION

In accordance with the present invention, there is provided a portable video power cell casing assembly for housing a plurality of power cells operatively connected together and each of which having a charged first pole and a like charged cylindrical portion and a second oppositely charged pole, the assembly including an outer nonconductive housing for supporting the cells and the connectors which operatively connect the cells, and characterized by partitioning means for separating and insulating the charged cylinder portion of adjacent aligned power cells from each other.

The present invention further provides a method of making the power cell casing assembly including the steps of disposing a plurality of the power cells between the partitioning walls of a base member and adjacent the floor portion thereof, electrically connecting the power cells in series within the base member, and enclosing the connected power cells to provide external insulation between the connected power cells and the external environment.

DESCRIPTION OF THE DRAWINGS

An embodiment of a video power pack assembly constructed in accordance with the present invention will now be described, by way of example only, with reference to the accompanying drawings, in which.

DETAILED DESCRIPTION OF THE DRAWINGS

Figure 1:
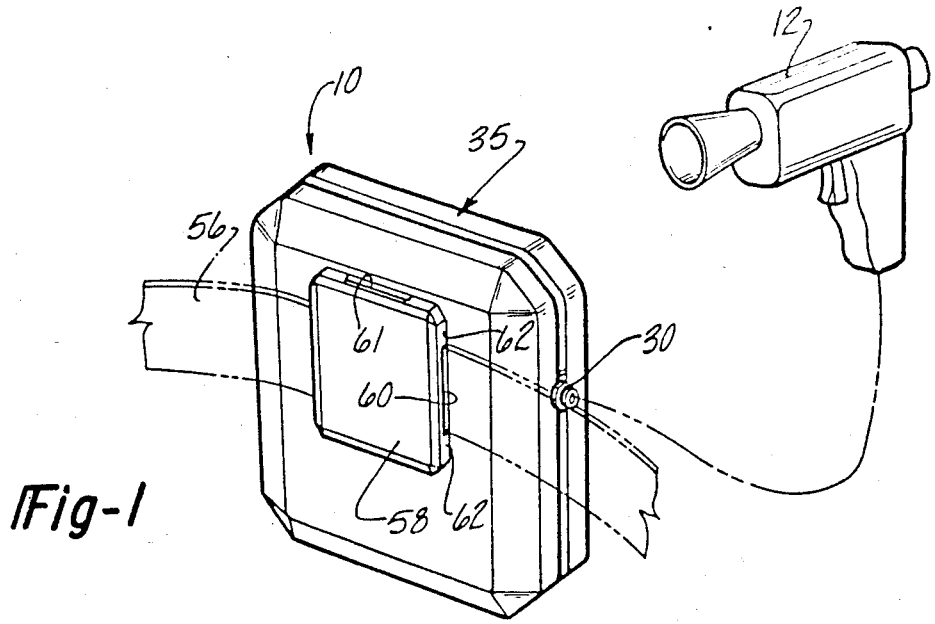
FIG. 1 is a perspective rear view of the subject assembly schematically connected to a video camera.
Figure 2:
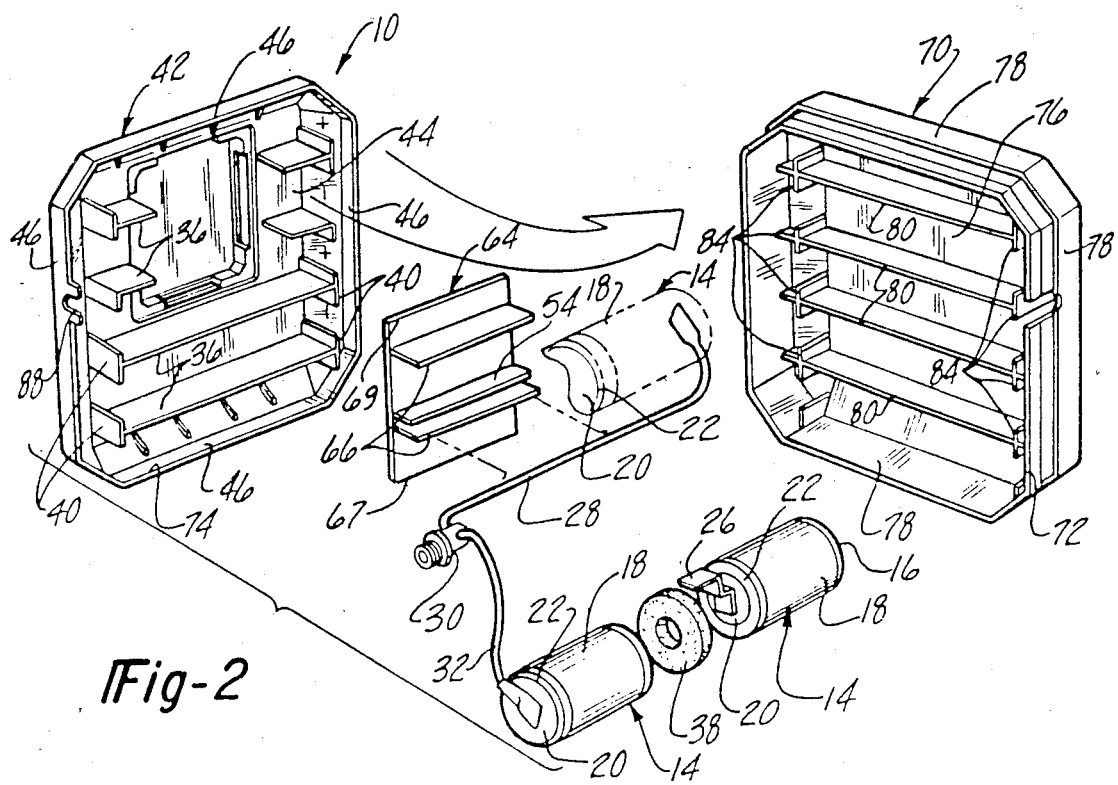
FIG. 2 is an exploded perspective view of the subject assembly.

Referring to the Figures, a power cell casing assembly for operating video equipment constructed in accordance with the invention is generally shown at 10. As shown in FIG. 1, the assembly 10 may be operatively connected to a video camera 12. Alternatively, the power cell assembly may be operatively connected to other video equipment.

The assembly 10 includes a plurality of power cells generally indicated at 14. Each of the power cells 14 has a charged first pole 16 and a like charged cylindrical portion 18. Generally, the first pole 16 and like charged cylindrical portion 18 have a negative charge. Each power cell 14 has an oppositely charged second pole 20. The second pole has a positive charge. The charged cylindrical portion 18 may have an end portion 22 which is wrapped around the oppositely charged second pole 20. An insulating washer is disposed between the wrapped portion 22 of the charged cylindrical portion 18 and the oppositely charged second pole 20 of the power cell 14 to prevent shorting of the cell. The assembly 10 further includes connector means for electrically connecting each of the power cells 14 in series to operate the video equipment 12. More specifically, the power cells 14 are aligned in the assembly 10 in five stacks or rows, each stack including two power cells 14. Each stack has an exposed first pole 16 and second pole 20. The connector means includes conductive strips 26 which interconnect the oppositely charged poles 16 and 20 of adjoining stacks of cells. Internally, each stack has a positively charged second pole 20 which is operatively connected to the negatively charged cylindrical portion of the other cells in the same stack by conductive connector strips 24. The series is completed by a first wire 28 which electrically connects the positively charged second pole 20 of end cell 14a to an adaptor member 30 and a second wire 32 which connects the negatively charged first pole 16 of the other end cell 14b to the adaptor 30. The adaptor 30 may receive a plug member from the video equipment 12. Thusly, the connector means electrically connects each of the power cells 14 in series.

The assembly 10 includes an outer nonconductive housing generally indicated at 35 in FIG. 1 for supporting the power cells 14 and the connector means thereof. The assembly 10 is characterized by including nonconductive partitioning means within the housing means 35 for insulating and separating the charged cylindrical portions 18 of adjacent ones of the power cells 14 from each other. More particularly, the partitioning means includes four partitioning walls 36 extending across the housing means 35 for separating the charged cylindrical portions 18 of adjacently aligned power cells 14. The partitioning walls are flexible yet provide substantial structural rigidity against compression as will be discussed further below. The power cells 14 made from various manufacturers are found to have a size range within a small range of tolerances. The partitioning walls 36 are spaced so as to be able to contain and align the power cells 14 therebetween whereby there is sufficient space for the slight variation in the sizes of the power cells from various manufacturers. Thusly, the partitioning walls 36 align the power cells 14 into five rows or stacks, each stack including two of the power cells 14. Thusly, each power cell is insulated from the adjacent power cell of the adjacent stack. Nonconductive washer members 38 insulate each cell in the stack from the aligned other cell 14 in the stack. The washers 38 also serve as compressible spacers to accommodate variances in tolerances of the cells. The conductive strips 26 have one end connected to the positively charged second pole 20 of one of the cells and another end fixedly secured to the negatively charged cylindrical portion 18 of the other cell in the stack. The strip 26 extends through an opening in the center of each washer 38.

The partitioning means further includes connector insulator means insulating and separating the connector strips 24 from the cylindrical portions 18 of the adjacent ones of the power cells 14. Contact of the connector strips 26 to the negatively charged cylindrical portion 18 would short out the entire system. The connector insulating means includes a plurality of end walls 40 disposed at the ends of each of the partitioning walls 36, the end walls being substantially perpendicular to each of the partitioning walls. Each connector strip 24 extends between a first charged pole 16 of one power cell 14 and an oppositely charged pole 20 of a second power cell 14 while the end wall 40 is disposed between the connector strips 24 and the charged cylindrical portion 18 of the power cells 14. The end walls 40 further provide means for retaining each pair of stacked cells together. Finally, each end wall 40 provides for further structural rigidity of the housing means 35, as will be described below.

Figure 3:
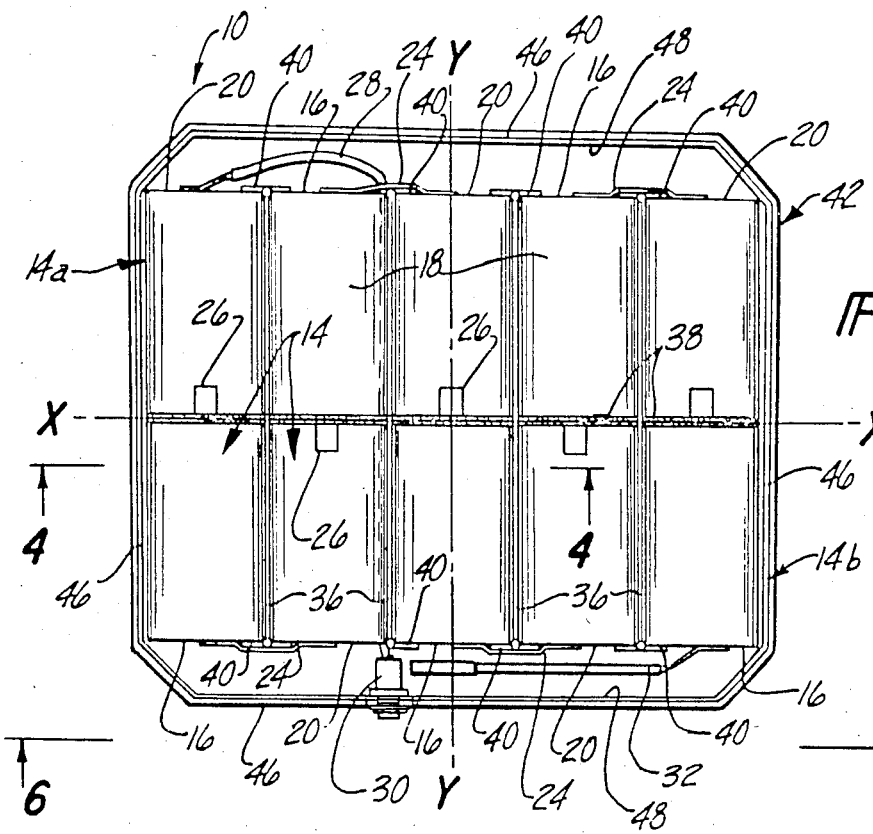
FIG. 3 is a top plan view of the base member of the assembly.

The housing means 35 includes a base member generally indicated at 42 in FIGS. 2, 3, 4, 5, 6 and 8. The base member 42 has a floor portion 44, the partitioning walls 36 extending upwardly from and across the floor portion 44. The base member 42 has side walls 46 extending upwardly from the floor portion 44 defining the outer periphery thereof. The side walls 46 adjacent each of the end walls 40 are spaced therefrom defining a channel 48 therebetween, as shown in FIG. 3. The connector strips 24, wire 32, and adaptor member 30 are disposed in the channel 48. The channel 48 further provides a buffer zone to allow for a slight compression of the side walls 46 upon external contact thereby further protecting the power cell assembly 10.

Figure 4:
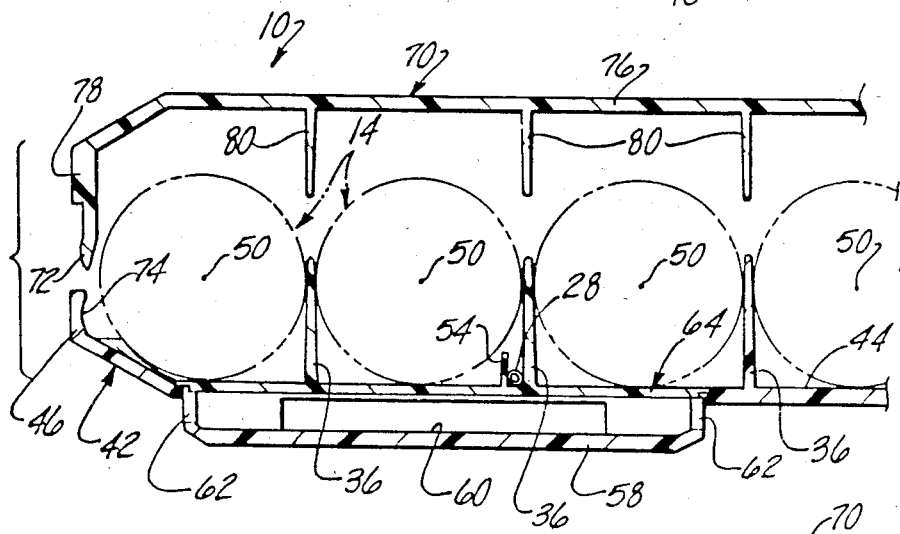
FIG. 4 is an enlarged cross-sectional view taken substantially along lines 4—4 of FIG. 3.
Figure 5:
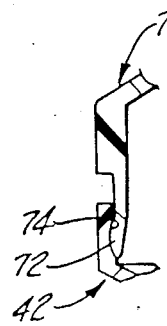
FIG. 5 is a cross-sectional fragmentary view of the connection between the lid member and the base member of the invention.
Figure 6:
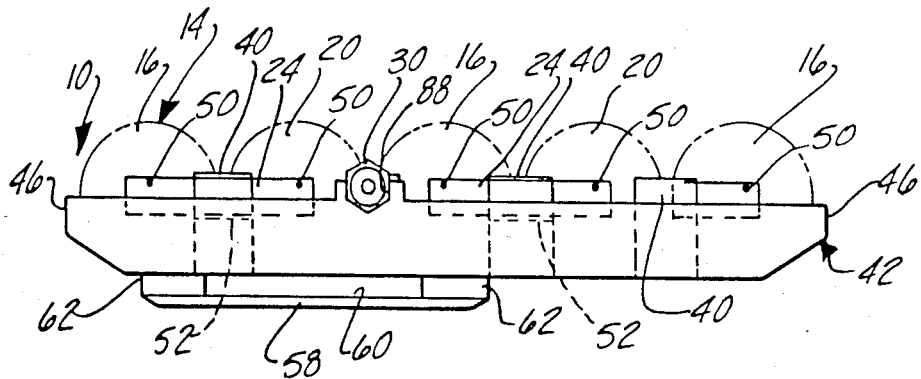
FIG. 6 is an elevational side view taken substantially along lines 6—6 of FIG. 3.
Figure 7:
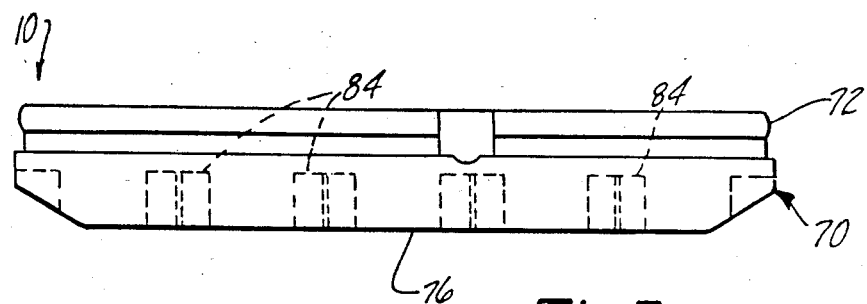
FIG. 7 is a side elevational view of the lid member of the invention.
Figure 8:
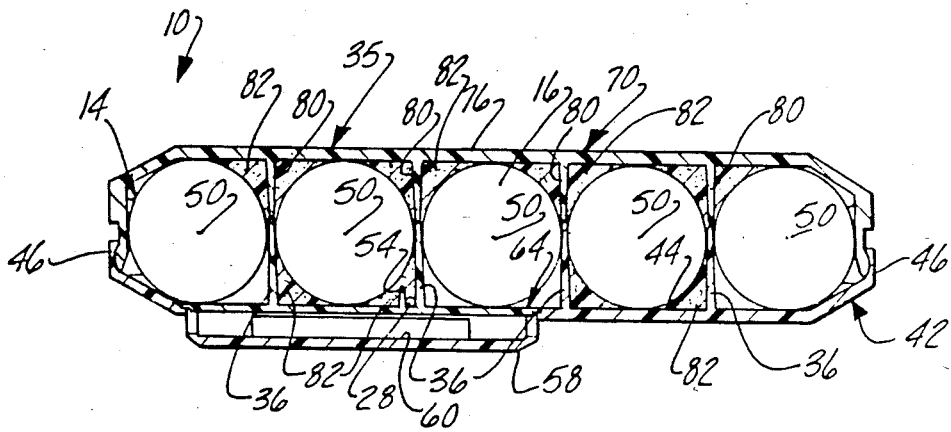
FIG. 8 is a cross-sectional view of the assembled power cell assembly.

The partitioning walls 36 extend from the floor portion 44 to a point above the side walls 46. More particularly, the partitioning walls extend to a point above the midpoint 50 of each of the power cells, as shown in FIGS. 4, 6, and 8. Thusly, the partitioning walls 36 effectively separate the charged cylindrical portions of the cells from the like charged cylindrical portions 18 of the adjoining cells 14 in the adjacent stack of power cells 14. The end walls 40 include connector strip support means supporting the connector strips 24 adjacent the end walls 40. The connector strip support means includes a lip 52 extending outwardly from each of the end walls 40 and defining an upper portion of the end walls above the lip 52, the upper portion of the end walls 40 extending to a point above the proximately disposed side wall 46. Each connector strip 24 has an end connected to the power cell 16 and the central portion of the connector strip rests upon the lip 52. The upper portion of each of the end walls 40 rises above the height of each side wall 46 so as to expose each of the connector strips 24 above the adjacent side wall 46. In the manner, there is access to each of the connector strips so that they may be easily soldered or otherwise connected to the power cell 14 in an efficient and simple manner. In other words, the positioning of the lip 52 so that the connector strips 24 are disposed above the side walls 46 exposes the connectors strips so that there is easy access of any equipment such as a soldering iron or welding gun to allow for efficient and simply access to the strips 24 for connection of the strips 24 to the power cells 14.

The assembly 10 includes wire guide means for guiding the wire 28 along the floor portion 44 adjacent one of the partitioning walls 36. The wire guide means includes a wire guide channel extending along the floor portion 44 adjacent one of the partitioning walls 36 whereby the wire 28 is force fit into the channel to be retained therein. A flange 54 extends upwardly from the floor portion 44 and is substantially parallel to and spaced from the adjacent partitioning wall 36 and defines the channel therebetween.

The assembly 10 includes belt retaining means for retaining the assembly 10 on the belt schematically shown at 56 in FIG. 1. The base member 42 includes a projection 58 extending downwardly therefrom, the belt retaining means including passageways 60 extending through the projection 58 for receiving the belt 56 therethrough. More particularly, the belt retaining means includes the first passageway 60 and a second passageway 61, the second passageway 61 being perpendicular to and intersecting with the first mentioned passageway 60. Thusly, a belt may be threaded through the first passageway 60 or through the second passageway 61 depending upon the user's preference. The base member 42 has a substantially flat outer surface. The projection 58 includes a substantially planar portion spaced from and parallel to the outer surface of the base member 42. The projection 58 further includes a plurality of legs 62 connecting the planar portion of the projection 58 to the outer surface of the base member 42, the passageway 60 extending between the planar portion of the projection 58 and the outer surface of the base member 42 and between the legs 62. The floor portion 44 has a downwardly recessed portion defining the projection 58. The assembly 10 includes an insert member generally indicated at 64 disposed over the recessed portion having a first surface being continuous with the remainder of the floor portion 44 and a second surface being the portion of the outer surface of the base member 42 within the passageway 60 of the projection 58 and 20 spaced from the planar portion thereof. The insert member 64 includes two upstanding walls 66 extending therefrom and defining a portion of a corresponding one of the partitioning walls 36 when the insert member 64 is disposed over the recessed portion. The insert member 64 further includes the flange 54 of the wire guide means, the flange 54 being disposed adjacent to and spaced from the upstanding walls 66 of the insert member 64. The floor portion 67 of the insert 64 which extends away from the wall 66 adjacent the flange 54 extends a greater distance away therefrom than the floor portion 69 which extends from the other wall 66 of the insert member 64. In other words, the floor portion 67 of the insert is wider as it extends from the wall 66 than the floor portion 69 thereof. Thusly, the base member 42 of the invention includes a projection 58 providing belt retaining means wherein the projection 58 is integral with the base member 42. This construction provides belt retaining means which is not easily broken off from the base member 42. Further, the assembly is compact in that the insert member 64 provides for a continuous floor portion 44 and continuous partitioning walls 36. Further, the base member can be molded in a single unit wherein the partitioning walls 36, belt retaining means, and side walls are an integral unit.

The assembly 10 includes power cell retaining means for retaining the power cells 14 between the partitioning walls 36 and the adjacent floor portion 44. The power cell retaining means includes a lid member generally indicated at 70 for completely enclosing the power cells 14 within the housing 35. The lid member includes engagement means for reversibly connecting the base member 42 to the lid member 70. The engagement means comprises a lip portion 72 of the lid member 70 which reversibly engages an inwardly curved depression in 74 in the side wall 46 of the base member 42.

The lid member 70 includes a substantially planar cover portion 76 and side walls 78 extending downwardly therefrom. The cover portion 76 engages the upper edge of the partitioning walls 36 to define power cell chambers for retaining the power cells 14 therein when the lid member 70 is connected to the base member 42 by the engagement means. More particularly, the partitioning means include a second plurality of partitioning walls 80 extending downwardly from the cover portion 76 of the lid member 70 for edge to edge contact with the partitioning walls 36 of the base member 42 to form the power cell chambers when the lid member 70 is connected to the base member 42 by the engagement means. The lid member 70 further includes end walls 82 each of the partitioning walls 80 of the lid member 70 are disposed between a pair of the end walls 84, the end walls 84 being in edge to edge contact with the end walls 40 of the base member 42 when the lid member 70 is connected to the base member 42. Thusly, the partitioning walls 36 and 80 and the end walls 40 and 84 meet in edge to edge contact to define the power cell chambers wherein the power cells 14 are retained. The partitioning walls 36 and 80 and end walls 40 and 84 further provide structural rigidity against compression of the housing 35. In other words, the partitioning walls 36 and 80 and end walls 40 and 84 provide insulation electrically and rigidity structurally to the assembly.

The assembly 10 further includes unitizing means for securing together the base member 42 and the lid member 70 and the power cells 14 as a unitized assembly. In other words, the unitizing means transforms the separate members into a substantially integral unit. The unitizing means includes an adhesive compound 82 disposed within the housing 35 and engaging the base member 42 and the lid member 70 and the power cells 14. Specifically, the adhesive compound 82 is disposed over the floor portion 44 between the first and second partitioning walls 36 and between the third and fourth partitioning walls 36, adhering to the power cells 14 between the partitioning walls 36, the adhesive being further disposed over the power cells 14 adhering the power cells 14 to the lid member 70, as shown in FIG. 8. In this manner, the adhesive compound 82 is disposed over the insert member 64 between the first and second partitioning walls 36 thereby further securing the insert member 64 and wire 28 within the assembly 10.

The invention further provides a method of making the power cell assembly 10 including the steps of disposing a plurality of the power cells casing 14 between the partitioning walls 36 of the base member 42 and adjacent the floor portion 44 thereof, thereby utilizing the base member 42 as an assembly tool. The power cells 14 are then electrically connected in series within the base member 42 and the assembly is enclosed to provide external insulation between the connected power cells 14 and the external environment. Thusly, the nickel cadmium power cells 14 which are quite powerful and dangerous to handle are initially disposed into the base member 42 and all further electrical connections are made while the cells 14 are retained within the base member 42. The method is further defined by including the steps of securing the electrical adaptor 30 within a mount portion 88 of the base member 42 and disposing the liquid adhesive 82 between the first and second partitioning walls 36 and the third and fourth partitioning walls 36. The power cells 14 are then disposed in the channels between the partitioning walls 36. The power cells 14 are electrically connected in series within the base member 42 and the wires 28 and 32 are connected between the adaptor 30 and each of the end power cells 14a and 14b of the series. Finally, the lid member 70 is secured over the base member 42 to encapsulate and insulate the connected power cells 14 while exposing the electrical adaptor 30 for connection to the video equipment 12.

The step of electrically connecting the power cells 14 together is further defined by disposing the power cells 14 having the conductive strips 26 secured thereto in a stack against another power cell 14, aligning the conductive strips 26 adjacent to the oppositely charged cylindrical portion 18 of the other power cell 14 in the stack while disposing the insulating ring 38 between the aligned power cells 14. The exposed end of the conductive strips 26 are operatively connected to the cylindrical portion 18 of the power cells 14 and the oppositely charged exposed ends of the remaining power cells 14 are connected in series.

The method further includes the steps of disposing the insert member 64 over the recess portion of the base member 42 to form the first and second partitioning walls 36 and the floor portion 44 therebetween and applying the liquid adhesive compound 82 over the floor portion 44 between the first and second partitioning walls 36 before disposing the power cells 14 thereon.

The invention has been described in an illustrative manner, and it is to be understood that the terminology which has been used is intended to be in the nature of words of description rather than of limitation.

Obviously, many modifications and variations of the present invention are possible in light of the above teachings. It is therefore, to be understood that within the scope of the appended claims wherein reference numerals are merely for convenience and are not to be in any way limiting, the invention may be practiced otherwise that is specifically described.

What is claimed is:

1. A method of assembling a power cell casing assembly (10) including a plurality of power cells (14) having a charged first pole (16) and a like charged cylindrical portion (18) and an oppositely charged second pole (20) for operating video equipment (12), the base member (42) including a recessed portion and an insert member (64) defining a portion of two of the partitioning walls (36) and a portion of the floor portion (44) of the base member (42), said method comprising the steps of: disposing the insert member (64) over the recessed portion of the base member (42) to form the first and second partitioning walls (36) and the floor portion (44) therebetween, disposing a plurality of the power cells (14) between the partitioning walls (36) of a base member (42) and adjacent the floor portion (44) thereof; electrically connecting the power cells (14) in series within the base member (42); applying a liquid adhesive (82) over the floor portion (44) between the first and second partitioning walls (36) and enclosing the connected power cells (14) to provide external insulation between the connected power cells (14) and the external environment.

2. A method as claimed in claim 1 wherein the base member includes four partitioning walls (36) defining five chambers, said method further defined by including the steps of:
   securing an electrical adapted (30) to the base member (42);
   disposing a liquid adhesive (82) between the first and second partitioning walls (36) and the third and fourth partitioning walls (36);
   disposing the power cells (14) in the channels between the partitioning walls (36);
   electrically connecting the power cells (14) in series within the base member (42);
   connecting wires (28, 32) between the adaptor (30) and each of the power cells (14a) (b) of the series; and
   securing a lid member (70) over the base member (42) to encapsulate and insulate the connected power cells (14) while exposing the electrical adaptor (30) for connection to video equipment.

3. A method as claimed in claim 2 wherein five of the power cells (14) have conductive strips (26) operatively connected to a charged pole (20) thereof, said step of electrically connecting the power cells (14) together being further defined by:
   disposing each of the power cells (14) having the conductive strips (26) secured thereto in a stack against another power cell (14), aligning the conductive strips (26) adjacent to the oppositely charged cylindrical portion (18) of the second mentioned power cells (14) while disposing an insulating ring (38) between the aligned power cells (14), operatively connecting the exposed end of the conductive strips (26) to the cylindrical portion (18); and electrically connecting the exposed oppositely charged ends of the power cells (14) in series.

4. A method of making a power cell casing assembly (10) including the steps of:
   forming a base member (42) having a floor portion (44);
   indenting a portion of the floor portion (44) to form a downwardly recessed portion defining a projection (58) on the opposite side of said base member (42), the recessed portion including a substantially planar portion and a plurality of spaced legs (62);
   covering the downwardly recessed portion with an insert member (64) to form a surface continuous with the remainder of the floor portion (44); and
   assembling the remainder of the power cell casing assembly (10).

* * * * *